US009619307B2

(12) United States Patent
Maltese et al.

(10) Patent No.: US 9,619,307 B2
(45) Date of Patent: Apr. 11, 2017

(54) ENABLING A WEB APPLICATION TO CALL AT LEAST ONE NATIVE FUNCTION OF A MOBILE DEVICE

(75) Inventors: Giulio Maltese, Rome (IT); Gaetano Ruggiero, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 758 days.

(21) Appl. No.: 13/593,883

(22) Filed: Aug. 24, 2012

(65) Prior Publication Data

US 2013/0055289 A1 Feb. 28, 2013

(30) Foreign Application Priority Data

Aug. 25, 2011 (EP) ..................................... 11178891

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)
*G06F 21/32* (2013.01)
*H04L 29/08* (2006.01)
*H04L 29/06* (2006.01)

(52) U.S. Cl.
CPC .............. *G06F 9/545* (2013.01); *G06F 21/32* (2013.01); *H04L 29/0809* (2013.01); *H04L 69/162* (2013.01)

(58) Field of Classification Search
CPC ...................................................... G06F 9/545

USPC ......................................................... 719/320
See application file for complete search history.

(56) References Cited

U.S. PATENT DOCUMENTS

| 5,956,483 | A | 9/1999 | Grate et al. |
| 2009/0055749 | A1 | 2/2009 | Chatterjee et al. |
| 2009/0288012 | A1* | 11/2009 | Hertel et al. ................... 715/738 |
| 2010/0311397 | A1* | 12/2010 | Li ............................... 455/414.1 |
| 2010/0318989 | A1 | 12/2010 | Dureau et al. |

FOREIGN PATENT DOCUMENTS

WO     2010144120 A2     12/2010

OTHER PUBLICATIONS

UK Application GB1213520.8 Combined Search and Examination Report, Dec. 3, 2012, 7 pgs.

* cited by examiner

*Primary Examiner* — Timothy A Mudrick
(74) *Attorney, Agent, or Firm* — Cuenot, Forsythe & Kim, LLC

(57) ABSTRACT

Enabling a web application to call at least one native function of a mobile device includes accessing the web application by a browser of the mobile device. The web application includes at least one GUI element. The mobile device operates a listener module that is a TCP/IP socket listener listening for an address including a localhost IP address and a port number. Upon selection of the GUI element, a cross domain HTTP request is submitted by the browser to the listener localhost IP address. The listener module receives the request and calls the at least one native function in dependence on the received request.

25 Claims, 3 Drawing Sheets

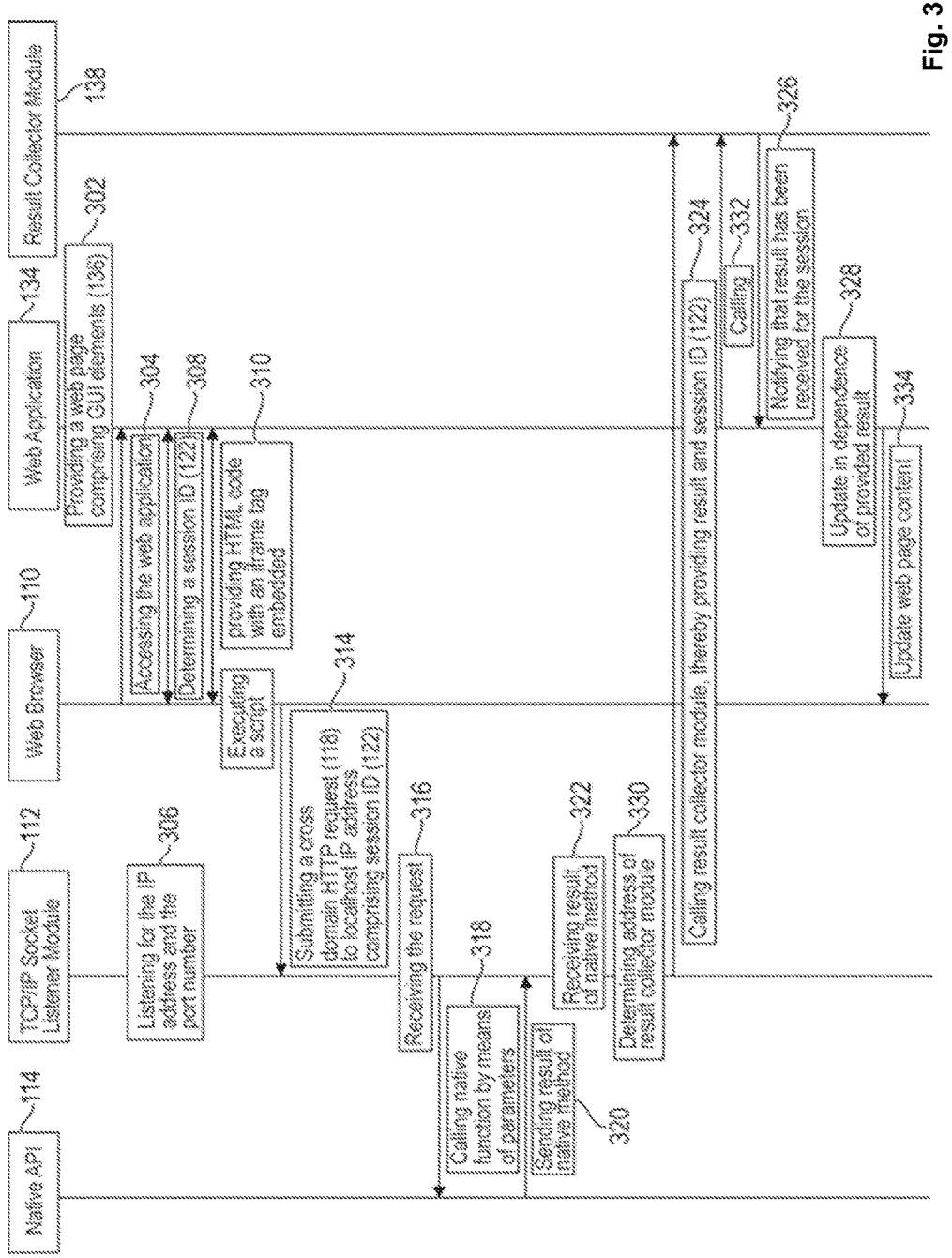

ENABLING A WEB APPLICATION TO CALL AT LEAST ONE NATIVE FUNCTION OF A MOBILE DEVICE

CROSS-REFERENCE TO RELATED APPLICATIONS

This application claims the benefit of European Application Number 11178891.5 filed on 25 Aug. 2011, which is fully incorporated herein by reference.

BACKGROUND

With currently available technologies on mobile devices the only way to allow a mobile web application to access native hardware functions requires that a custom-plugin must be developed for the browser that accesses the web application as a client. The main limit related to hitherto existing approaches is that, in order to ensure cross-platform, cross-mobile, cross-operation-system and cross-operation-system compatibility, the browser plugin must be developed for any combination of hardware/operation systems/browsers (examples of hardware: iPhone, Smartphones, mobile devices from Apple (Apple is a trademark of Apple Inc.) or Nokia (Nokia is a trademark of Nokia Corporation) etc./examples of operation systems: Android (Android is a trademark of Google Inc.), iOS etc./examples of browsers: Pocket Internet Explorer, Mobile Firefox (Firefox is a registered trademark of Mozilla Foundation), Opera Mobile (Opera Mobile is a trademark of Opera Software ASA), Dolphin Browser etc. . . . (Dolphin is a trademark of Dolphin Technology Inc.). Thus, the exceedingly high number of combinations of hardware/operation systems/browser plus browser currently available makes this approach unpractical due to the huge amount of effort needed to develop custom-plugins to cover every possible combination.

The hitherto existing standards for browser security policies do not allow cross-domain calls, meaning that the scripts of a web page provided by a server of a first domain trying to send an HTTP request to another domain are blocked and an access denied message is displayed in the browser. Therefore a standard XML http request, issued from a JavaScript code, is denied by the browser, if the browser or script specifies another domain address, including 'local host'.

Moreover, another important constraint of hitherto existing approaches is that iFrame cross-domain calls can only send client-to-server requests, but cannot handle any responses.

Consequently, the communication supported by existing approaches for mobile devices is only unidirectional.

BRIEF SUMMARY

An embodiment can include a method of enabling a web application to call at least one native function of a mobile device. The method includes accessing the web application by a browser of the mobile device. The web application includes at least one graphical user interface (GUI) element. The mobile device operates a listener module that is a TCP/IP socket listener listening for an address including a localhost IP address and a port number. Upon selection of the GUI element, a cross domain HyperText Transfer Protocol (HTTP) request is submitted by the browser to the listener localhost IP address. The listener module receives the request and calls the at least one native function in dependence on the received request.

Another embodiment can include a mobile device having a processor. The processor can be configured to initiate executable operations including accessing the web application by a browser of the mobile device. The web application includes at least one GUI element. The mobile device operates a listener module that is a Transmission Control Protocol/Internet Protocol (TCP/IP) socket listener listening for an address including a localhost IP address and a port number. Upon selection of the GUI element, a cross domain HTTP request is submitted by the browser to the listener localhost IP address. The listener module receives the request and calls the at least one native function in dependence on the received request.

Another embodiment can include a computer program product for enabling a web application to call at least one native function of a mobile device. The computer program product can include a computer-readable storage medium having stored thereon program code that, when executed, configures a processor to perform operations including accessing the web application by a browser of the mobile device. The web application includes at least one GUI element. The mobile device operates a listener module that is a TCP/IP socket listener listening for an address including a localhost IP address and a port number. Upon selection of the GUI element, a cross domain HTTP request is submitted by the browser to the listener localhost IP address. The listener module receives the request and calls the at least one native function in dependence on the received request.

BRIEF DESCRIPTION OF THE SEVERAL VIEWS OF THE DRAWINGS

The above and other items, features and advantages of the embodiments of the invention will be better understood by reading the following more particular description of exemplary embodiments of the invention in conjunction with the figures wherein:

FIG. 3 depicts communication steps between components of the mobile processing device and the remote server system leading to the activation of native hardware functions in the web application of a mobile device.

DETAILED DESCRIPTION

Figure 1:
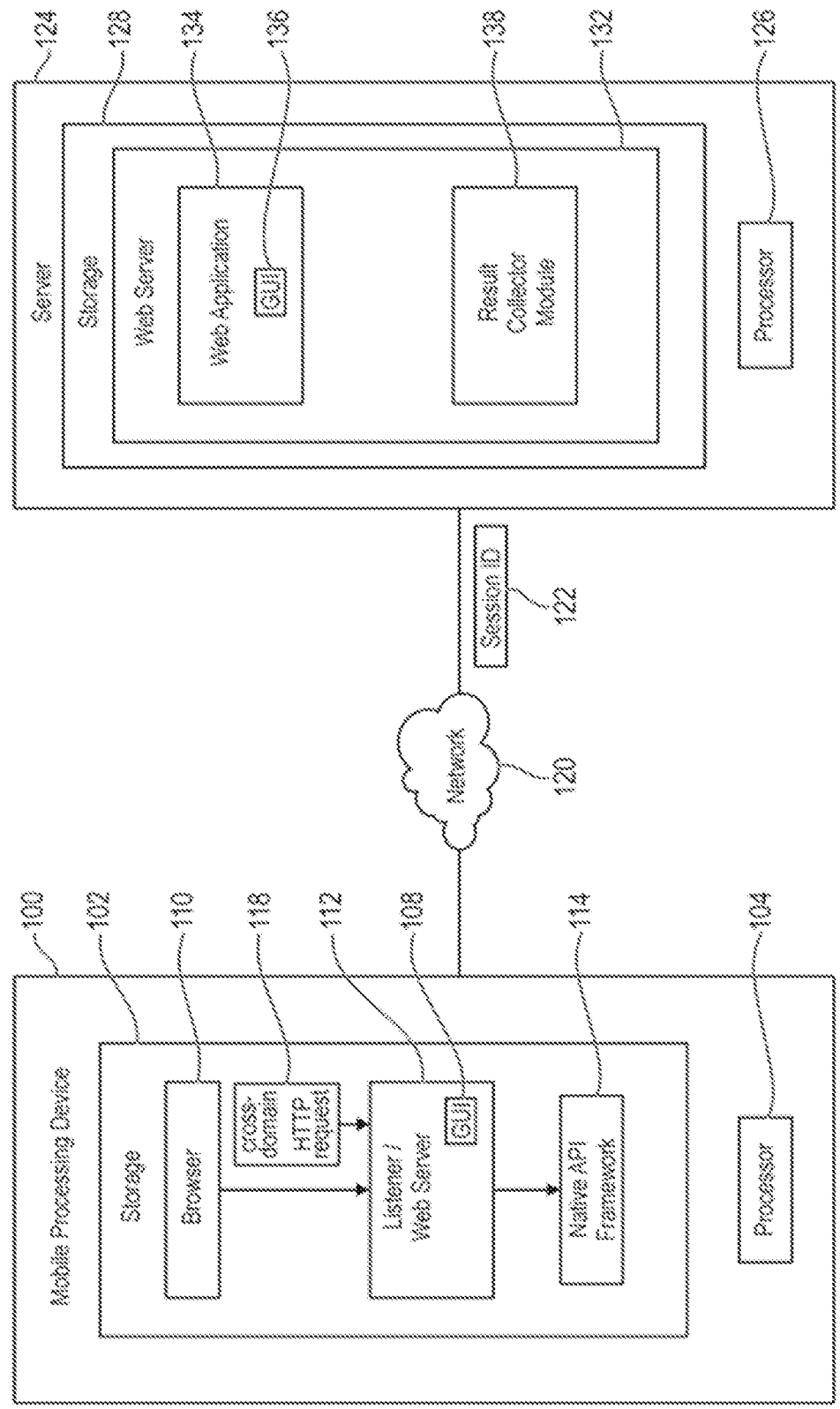
FIG. 1 depicts a computer system including a mobile processing device and a remote server system connected via a network.

The embodiments disclosed herein relate to the field of data processing, and more particularly, to a enabling a web application to call at least one native function of a mobile device.

It is an objective of embodiments of the invention to provide for an improved computer-implemented method, a computer system and a computer-readable non-transitory storage medium for enabling a web application to call native functions of the mobile device. Said objective is solved by the subject matter of the independent claims. Advantageous embodiments are described in the dependent claims.

A 'native function', as used herein, encompasses native hardware functions of the mobile device. In some embodiments, said native functions may also cover functionalities provided by the operating system and/or file system. Said function could be, for example, reading from and/or writing to the file system of the mobile device. A hardware function can be, for example, taking a picture by the camera.

In one aspect, the invention relates to a computer-implemented method for enabling a web application to call at least one native function of a mobile device, the method including:
  assessing the web application by a browser of the mobile device, the web application including at least one graphical user interface (GUI) element, the mobile device operating a listener module, the listener module being a Transmission Control Protocol/Internet Protocol (TCP/IP) socket listener listening for an address including a localhost IP address and a port number;
  upon selection of the GUI element, submitting a cross-domain HyperText-Transfer Protocol (HTTP) request by the browser to the localhost IP address;
  receiving, by the listener module, the request;
  calling, by the listener module, the at least one native function in dependence on the received request.

Said embodiments may be advantageous, because the browser-independent technology provides a device-independent way to allow a web application running on a mobile web browser to access native hardware functions and native operation system functions of the respective mobile device, depicting a general method independent from the mobile device platform and browser type, which can be easily applied to a variety of hardware/operation-system/browser combinations without the need to implement browser-specific, operation-system-specific and/or hardware-specific plugins for calling native functions.

In computing, a graphical user interface is a type of user interface that allows users to interact with electronic devices with images rather than text commands. A GUI represents the information and actions available to a user through graphical icons and visual indicators, herein referred to as GUI elements, such as secondary notation, as opposed to text-based interfaces, typed command labels or text navigation. The actions are usually performed through direct manipulation of the graphical elements.

A 'browser' as used herein is a software application for retrieving, presenting, and traversing information resources on the World Wide Web. An information resource is identified by a Uniform Resource Identifier (URI) and may be a web page, image, video, or other piece of content.

According to embodiments, the method allows a web application to exploit rich native client capabilities on mobile devices, with the method being based on a TCP/IP socket listener working like a http server that interacts with a web browser by means of an HTTP request, with the web browser triggering an HTTP call to the TCP/IP socket listener which will perform the required native client operation.

According to embodiments, the listener module is a web server.

Said embodiments may be advantageous, because the implementation of the listener module as a web server allows a better capability to handle the http protocol for browser to agent communications than it would be the case the listener module would be implemented as a generic TCP/IP socket server. A simple TCP/IP communication could only be achieved, if the browser is enriched with additional plugins, thus not complying with general standards. An HTTP protocol, in contrast, is natively supported by any HyperText-Markup Language (HTML) tag or JavaScript command embedded in almost all standard browsers.

According to embodiments, the cross-domain HTTP request includes one or more parameters, wherein the at least one native function is indicated by at least one of the parameters. According to some embodiments, one or more of said parameters may be provided by the listener module as input parameters of the called native function.

Said embodiments may be advantageous, because by the interaction between the web application and the web browser by means of an Asynchronous JavaScript and eXtensible Markup Language (XML) (AJAX) HTTP request, the browser hosting a JavaScript code will trigger an HTTP call to the TCP/IP listener, thus forcing the client-side cross-domain HTTP request to perform the required native client operation. That means that a particular website can force its client by means of at least one parameter for a native function to perform this required native function integrated in the hardware of the mobile device. The precondition of such a cross-domain HTTP domain is that AJAX is not disabled across domains to prevent allowing a particular website to force its client to perform the requested native function integrated in the client's hardware. With this approach, the JavaScript compiler running in the mobile device's web browser will provide the access to native API points of access.

For example in order to take a picture and save the image on the file system of the local mobile device, the JavaScript will provide, in dependence on parameters being selected and triggering the execution of a specific script, the 'takeAPicture(filename)' method that takes filename as input parameter, takes a picture and saves it in the specified file.

According to embodiments, the listener module is implemented based on a cross-platform language.

Depending on the embodiments, different platform languages can be used, e.g. Java, C, C++, C# and/or different technologies like OSGi, .NET Compact Framework, depending on the operation system of the target mobile platform, thus allowing code compatibility and eliminating the need of redeveloping the listener in case some components of the device like hardware, operation system or browser changes.

The listener module may be developed on top of the OSGi (Open Service Gateway Initiative) framework, offering SOA (Service-oriented architecture) capabilities to all hosted applications. SOA defines how to integrate widely disparate applications for a Web-based environment and uses multiple implementation platforms. This may be advantageous, as the OSGi platform having several implementation modes (for example Eclipse Equinox—which is a Java-based instance of OSGi libraries and which can be deployed on any mobile device that supports Java—) supports almost all operation systems having a Java Virtual Machine, corresponding to a constellation which can be found on almost all mobile devices.

The listener module may be upgraded by a remote server according to a push mechanism. For the changes, upgrades or deployment of additional features can be managed remotely without any need to locally access the device. Another advantage is that implementation of the listener as a web server runs platform-independently. Furthermore, the implementation of the listener as a web server can be distributed over all the required platforms by using the same code version. According to embodiments, the listener and the OSGi framework share a common deployment infrastructure. This may be advantageous, because the deployment process will be simplified because of an involved reduction of heterogeneity of components, this allowing even automatization of the deployment process.

According to embodiments, submitting the cross-domain HTTP request includes executing, by the browser, a script being contained in the HTML code of the web application, whereby the cross-domain HTTP communication is achieved by HTML functionalities including an iFrame tag embedded in the HTML code of the web application.

By means of the use of iFrame tags the claimed invention circumvents current security settings of mobile browsers prohibiting cross-domain HTTP communication, i.e., prohibiting any script within a web page provided under a first domain to submit a HTTP request to another domain. So the claimed invention allows cross domain HTTP communication on mobile browsers.

An <iframe> tag is an HTML tag used to embed a document inside another, resulting in a "picture-in-picture" feature. The <iframe> tag is a tag that allows creation of an "internal" frame inside a document. The internal frame can contain any HTML document, and clicking a link inside the <iframe> causes the target document to be loaded inside the internal frame as well.

An Inlineframe (called iFrame) is an HTML element designed for structuring a web page. It is used to display the contents of other web pages as a stand-alone document in a defined area of a browser. An <iframe> tag defines an inline frame that contains another document.

According to embodiments, the parameters of the web application may be contained in the contact details the listener module needs to send a result to the result collector module or to call the methods of the result collector. This may be especially the case the web application and the result collector have been produced by the same manufacturer.

Said embodiments may be advantageous, because the listener module knows the location of the result collector module and how the result collector module can be contacted. According to embodiments of the invention, the web application is operable to call a native function by means of an iframe tag submitting an HTTP request to the local host address of a listener module listening to said local host address. As said HTTP request may include parameter specifying the contact data of the result collector module, also the communication in the reverse direction from the listener module to a remote result collector module is supported. This means that a bidirectional communication between the listener module and the result collector module is possible according to embodiments of the invention.

Said embodiments may be advantageous, because the method claimed by the invention leverages the capability offered by the HTML language to embed in the web page also cross-domain contents by the usage of the iFrame HTML tag thus overcoming any security restrictions.

According to embodiments, the cross-domain HTTP request includes a session ID being particular to a session between the web application and the browser, the method further includes:
  receiving, by the listener module, a result generated by the at least one native method;
  providing, by the listener module, the result and the session ID to a result collector module via a network, the result collector module running on the first remote computer system, the web application running on the first or on the second remote computer system;
  providing, by the result collector module, a notification to the web application that the result has been received for the session,
  wherein preferentially the listener module makes use of one or more of the parameters received via request to address and call the result collector module.

The assignment of a session ID, being particular to a session between the web application and the browser and also being integrated in the notification sent from the result collector module to the web application, allows for uniqueness and traceability of the web session and the results of a request. The bidirectional feedback communication between the client- and server-sided components of the system provides for a complete control, if a request called by the web application has been completely performed or not.

According to embodiments, the web application is updated in dependence on the provided result.

For example, the web application may be hosted on a remote server. When the web browser of the mobile device connects to the remote web site, an application page may be downloaded and rendered in the browser content pane. A native functionality may be triggered with a push button that sends an HTTP request to the listener module working like an HTTP server that handles HTTP requests, parses the content of the request, launches a native call, parsing content to determine parameters being indicative of the native function, collects the result of the call and if required, sends the call back to the server that hosts the web application.

Said embodiments may be advantageous, because the update of the web application in dependence on the provided result allows for a dynamic adaptability to the executed update of the content of the web page provided by the web application. For example, in the case GPS coordinates have to be visualized, an update of the source code of the HTML page will be necessary, thereby allowing to display on the webpage of the web application a dynamically and repeatedly updated visualization of the current position of the user.

The capability of being updated in dependence on the provided result allows for a web application being able to integrate a broad range of client's native capabilities of different types such as collecting a real time audio stream and sending it to the back-end server, accessing the mobile device's file system or changing the settings of the mobile device.

According to embodiments, the result collector module is operable to execute a result handler upon a call by the listener module, the result handler being operable to receive the result by the result collector module and making the result available to the web application. For example, this may be used for a web-application that may block a user of the browser to navigate forward or backward within the web application until the web application receives a notification that the result has been uploaded successfully.

According to embodiments, the listener module using the received parameters may identify the address of the result collector module, call the result collectors result handler and provide the result of the native function as an input parameter value to the called result handler of the result collector module. For example, the picture taken by the camera may be provided by the listener module as input parameter value of the called result handler.

Said embodiments may be advantageous, as the server-sided component, the result collector module, overcomes limitations of previous approaches, namely a missing capability to support bidirectional cross-domain communication. The claimed invention allows a bidirectional communication between, the server-sided result collector module and the listener, including an iFrame communication by which the parameters of the iFrame tags are used for determining source and destination of the iFrame communication in both directions between the result collector module and the listener. So the result collector module in the claimed invention is enabled to handle responses.

According to embodiments, the result collector module is operable to execute a check result received function, said function including checking, by the result collector module upon a call by the web application, if the result was received, and notifying the calling web application of the successful receipt of the result, and/or wherein the result collector module is operable to execute a provide-result function, said function including providing, upon a call of the web application, the result of the calling web application.

Said embodiments may be advantageous, because there is a complete control, if the request of the web application is fulfilled or not. This server-sided result collector module checks, if the result was received or not and sends a message to the calling web application.

According to embodiments, the result collector module may be operable to execute three methods:

an upload handler: uploads result binary/text file to the result collector module and makes it available to the web application, check-result-received function: informs the calling web application that the result upload completed successfully, provide-result-function: makes the results stored by the collector module available to the calling web application.

According to embodiments, each of the methods can be called via a network, e.g., web service interface, remote procedure calls etc.

For example, the result collector module, upon having received a call by the listener module checks by querying the listener, if the results of a native call are available and retries until one of the following conditions is satisfied: the method check-result-received function returns true or the number of retries exceeded the maximum allowed (which may be a configuration parameter), with at least some parameters including also address details of the result collector module. The advantage of using such a constant availability check like the method check-result-received function is that if an error occurs, subsequent queries will not generate callbacks.

According to embodiments, the web application, calling the check-result-received function, sends the session ID via the call as a key for checking whether the result created for the session of said session ID was successfully received by the result collector module. In addition or alternatively the web application, calling the provide-result function, sends the session ID via the call as a key for selecting the result to be provided to the web application.

Said embodiments may be advantageous, because by the usage of an HTTP session ID which is treated as an additional parameter in the call of a web application, the assignment between the call of the web application and the received result sent by the result collector module are uniquely identified. A further advantage of the usage of the unique session ID in the core of the web application is traceability and the possibility of historiography.

According to embodiments, the web application calls repeatedly the check-result-receive function until a confirmation of a successful receipt of the result is obtained or until the number of repeated calls exceeds a first threshold variable, and in case the check-result-received function returned a notification of a successful receipt of the result, the web application calls the provide-result function to receive the result from the result collector module, thus receiving the result.

Said embodiments may be advantageous, because the repeatedly executed checking of the web application, if a result of the previously sent call is available, shortens the time of waiting of the web application and interrupts the request—from the perspective of the user the waiting phase of the web application 134—in the case the result will not be delivered because of an error. Thus the performance of the web application will be improved.

According to embodiments, the native function called by the listener module gathers biometrical data from the user of the mobile device, wherein the gathered biometrical data is provided as the result to the result collector module, the method further including:

evaluating, by the result collector module, the biometrical data of the user to determine if the user is authorized to access security function provided by the web application, evaluation returning an evaluation result;

downloading the evaluation result by the web application via the provide-result function;

granting or denying the user access to the security function by the web application in dependence on the evaluation result.

According to embodiments, the listener module may call from the native API framework of the mobile device a native function which should gather biometrical data of the user, e.g., by taking a picture by means of the mobile's camera or taking a fingerprint by means of a sensor integrated in the mobile device. The recorded biometrical data, depicting the result of the execution of the native function, are then sent back to the listener module. The listener module, after having determined the address of the result collector module, sends the results to the result collector module, which generates an evaluation result gained by comparison of the captured biometric with a stored template or stored reference data of a database to verify that the individual is who he claims to be. The web application downloads the evaluation result concerning successful verification or not via the provide-result function. Having received a positive confirmation concerning the evaluation of verification, the web application grants access to the security function. In the case of a negative confirmation of verification by means of the biometrical verification procedure using native functions, the user will be denied to access the security function by the web application.

Said embodiments may be advantageous, as there is no other device necessary to control user's access to a security function of the web application using native functions of the hardware of the respective mobile device. Said embodiments may be used for checking, if a user is allowed to execute a certain web application.

In a further respect, the invention relates to a computer system including the mobile processing device, the mobile processing device including:

a processor being operable to execute at least one native function of the mobile processing device and being operable to execute steps of a method for enabling a web application to call the at least one native function;

a browser being adapted for accessing the web application, the web application including at least one GUI element;

a listener module, the listener module being a TCP/IP socket listener listening for an address including a localhost IP address and a port number;

wherein upon selection of the GUI element the browser submits a cross-domain HTTP request to the localhost IP address, wherein the listener module is operable to receive the request and wherein the listener module is operable to call the at least one native function in dependence on the received request.

According to embodiments, said computer system further includes a remote computer system being connected to the mobile processing device via a network, the remote computer system including:

a result collector module being operable to receive, from the listener module, the session ID and a result generated by the at least one native method via a network, and sending a notification to the web application that the result has been received for the session.

According to embodiments, the cross-domain HTTP request includes a session ID being particular to a session between the web application and the browser.

In a further aspect, the invention relates to a computer-readable, non-transitory storage medium, the storage medium including computer-interpretable instructions which when executed by a processor, cause the processor to execute the steps of any one of the above methods to be executed by the browser and/or the listener module.

In a further aspect, the invention relates to a computer-readable, non-transitory storage medium, the storage medium including computer-interpretable instructions which when executed by a processor, cause the processor to execute the steps of any one of the above methods to be executed by the results collector module alone or in combination with the web application.

As will be appreciated by one skilled in the art, aspects of the present invention may be embodied as a system, method or computer program product. Accordingly, if not explicitly stated otherwise, aspects of the present invention may take the form of an entirely hardware embodiment, an entirely software embodiment (including firmware, resident software, micro-code etc.) or an embodiment combining software and hardware aspects that may all generally be referred to herein as a 'module' or 'system'. Any combination of one or more computer-readable medium(s) may be utilized.

FIG. 1 depicts a computer system including a mobile processing device 100 operatively coupled via a network 120 to a remote server 124. The mobile processing device 100 includes a processor 104 being operable to execute at least one native function of the native IP framework 114 of the mobile processing device 100 and being operable to execute steps of a method for enabling a web application 134 provided by a web server 132 of a remote server system 124, to call at least one native function of the native IP framework 240 running on the mobile device 100.

The mobile processing device 100 includes a browser 110 which is adapted for assessing the web application 134. The web application 134 includes at least one GUI element 136. The listener module 112 of the mobile processing device 100 constitutes a TCP/IP socket listener which listens for an IP address and the port number.

Upon selection of the GUI element 108 by a user, the web browser 110 submits a cross-domain HTTP request 118 to the localhost IP address of the listener module 112. The listener module 112 listens to the localhost address and is able to receive the request 118 and calls at least one native function of the native IP framework 114 of the mobile device 100 in dependence on the received request. The cross-domain HTTP request 118 includes a session ID 122 which is particular to a session between the web application 134 and the web browser 110.

The remote computer system 124 includes a result collector module 138 which is operable to receive from the listener module 112 the session ID 122 and a result generated by at least one native method of the native IP framework 114 via a network 120. The result collector module 138 sends a notification to the web application 134 that the result has been received for the session. This notification includes the session ID 122. The notification is sent via an interface, for example, a web interface, a remote procedure call or the like. According to the depicted embodiment, the web application 134 and the result collector module 138 are localized on the same server.

The server system 124 includes a processor 126 to execute the steps to be executed, according to any one of the above methods, by the web application and/or by the result collector module, e.g., the internet or an Intranet.

In this embodiment the web application 134 and the result collector module 138 are localized on one server 124. In another embodiment of the invention the web application and the result collector module 138 may be localized on two different server systems, operatively coupled by a network.

Figure 2:
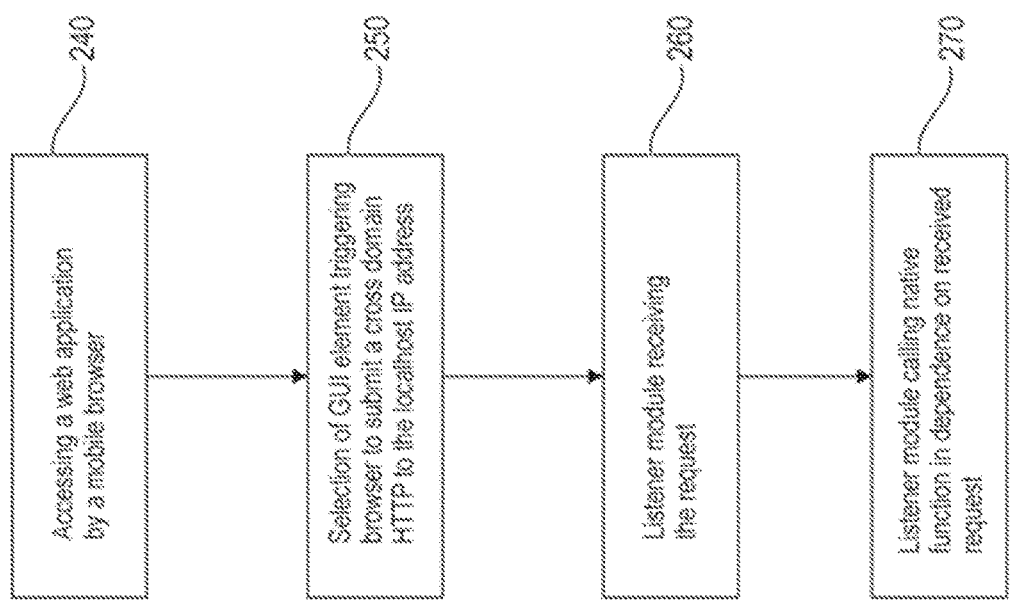
FIG. 2 depicts a flow chart depicting steps by which a web application is enabled to call a native function of a mobile device.

FIG. 2 depicts the method steps by which the computer-implemented method enables a web application 134 to call at least one native function 114 of a mobile device 100. In step 240 a web application 134 is accessed by a browser 110 of the mobile device 100. Upon selection of a GUI element 108 in step 250 the browser 110 submits a cross domain HTTP request 118 to the localhost IP address. In step 260 the listener module 112 receives the request 118. In dependence on the received request 118 the listener module 112 in step 270 calls the requested native function 114.

FIG. 3 depicts the method steps for enabling a web application to call at least one native function of a mobile device 100.

A user operates a mobile phone on which a listener module which listens 306 to the localhost address runs. In step 304 the user accesses a web application by opening a web page provided by said web application in his browser. In step 308, a session ID may be determined for the browser session and the web application. The user accesses via his browser in step 310 a web page of the web application. Said web page includes special HTML code which will allow the web application that allows a user, via the web application, to interact with a native function of his mobile device. Said native function may be, for example, a camera. Upon selection of said GUI element (138) by the user, the execution of a script is triggered in step 212. The script submits a HTTP request to an address specified in an iFrame tag.

The web browser 110 submits by executing a script in step 314 a cross-domain HTTP request 118, specified in an iFrame tag, to the local host IP address of the TCP/IP socket listener module 112, with the cross-domain HTTP request 118 including the session ID 122.

The following lines show an example of an <iframe> tag having an src attribute having the value 'localhost'.
<iframe src="http://localhost" style="width: 90%; height: 300px"></iframe>

When said script is executed by the browser of the mobile device, the TCP/IP socket listener, acting as a web server, and running locally on the mobile device, receives an HTTP request submitted by the browser. It is also possible to create links pointing to another domain page that are loaded into the iFrame tag, thus being visible inside the <iframe> by altering the links so they are loaded inside a specific frame through the optional "name" attribute of the <iframe>. Example:

<div><a href="http://localhost" target="internal">localhost</a></div>
<iframe src="http://www.google.com" style="width: 90%; height:300px" name="internal"></iframe>

By giving the <iframe> a "name" attribute, and using the "target" attribute of the <a> tag to specify that name, the link pointing to another domain page is loaded into the <iframe>.

Here an example demonstrating the dynamic interaction of static HTML tags (iframe tag with src attributes and parameters) with the dynamically executed java script code. As soon as the button is clicked ("on click") by a user, the corresponding script is executed and an iframe is built sending an HTTP request to the local host.

```
<html>
<head></head>
<body>
<input type="button" name="button1" Value="TakeAPicture"
onclick="document.all.frame1">
<IFrame name="frame1"
src="localhost:?session=133242&parameter1=value1&parameter2=
value2¶meter3=value3" width="550px" style="border-
width: 0px; border-color:#ffffff; border-style: solid;" >
</body>
</html>
```

The Html tag <input type="button" name . . . > specifies a GUI element of type 'button' which is displayed to the user as a component of the web page of the application program displayed in the browser of the mobile device. In case the user selects said button ("onclick"), a Javascript routine is executed causing the browser to display an iframe, said iframe submitting an HTTP request to the address specified in the src attribute of the iframe tag. Said src attribute may include additional parameters, e.g. a session key.

The parameter 1, for example, may mean that the camera should be used. Parameters 2 to 4 may specify the IP address, the port and/or other data the listener module needs to find the result collector module.

The TCP/IP socket listener module 112 receives the request in step 316. The TCP/IP socket listener module 112 calls a native function in dependence on parameters in step 212 from the native API framework 114 in step 318. The native IP framework 114 sends the result of the native method in step 320 to the TCP/IP socket listener module 112, which receives the result of the native method in step 322.

The TCP/IP socket listener module 112 after having determined the IP address of the result collector module 138 and having called the result collector module 138 in step 330, provides the result and a session ID 122 in step 324 to the result collector module 138. Depending on the embodiment, this may be executed based on a push or a pull method. Preferentially, the listener module calls a remote of the result collector module, thereby providing the result as an input parameter to the called result handler. The result collector module receives in step 332 a request from the web application, said request calling a check-results-received function of the result collector module. The result collector checks whether the result was received successfully from the listener module. Then, in response to the receipt of the call of step 332, the result collector notifies in step 326 the web application that the result has been received for the session by addressing the web application 134. The web application 134 makes an update of the source code of the web page in step 328 in dependence of the provided result in step 328. In step 334 the web page is updated.

According to embodiments, the web application 134 calls repeatedly the result collector module 138, thereby sending a session ID 122, provided via the call, as a key.

The result collector module 138 then executes a check-result-receive function. The result collector module 138 notifies the web application 134 about a successful receipt of result or in the case the number called exceeded the pre-defined threshold value, an error message.

The web application 134 calls the result collector module 138, thereby sending a session ID 122 as a key. Upon this, the result collector module 138 executes a provide-result function. The result collector module 138 provides the result to the web application 134, which receives the result. The webpage may be dynamically updated, thereby displaying the result provided by the native function, e.g. displaying the picture taken by the camera in the updated HTML page.

| List of Reference Numerals | |
|---|---|
| 100 | Mobile processing device |
| 102 | Storage medium of the mobile processing device |
| 104 | Processor of the mobile processing device |
| 108 | GUI of the mobile processing device |
| 110 | Web browser of the mobile processing device |
| 112 | Listener module or web server of the mobile processing device |
| 114 | Native IP framework of the mobile processing device |
| 118 | Cross-domain HTTP request |
| 120 | Network |
| 122 | Session ID |
| 124 | Remote computer system acting as a server |
| 126 | Processor of the remote computer system |
| 128 | Storage medium of the remote computer system |
| 132 | Web server of the remote computer system |
| 134 | Web application of the remote computer system |
| 136 | GUI of the remote computer system |
| 138 | Result collector module of the remote computer system |

What is claimed is:

1. A method of enabling a web application to call at least one native function of a mobile device, the method comprising:
    accessing the web application by a browser of the mobile device, the web application comprising at least one graphical user interface (GUI) element, the mobile device operating a listener module, the listener module being a Transmission Control Protocol/Internet Protocol (TCP/IP) socket listener listening for an address comprising a localhost IP address and a port number;
    upon selection of the GUI element, submitting a cross domain HyperText-Transfer Protocol HTTP request by the browser to the listener localhost IP address;
    receiving, by the listener module, the request; and
    calling, by the listener module, the at least one native function in dependence on the received request.

2. The method of claim 1, wherein
    the listener module is a web server.

3. The method of claim 1, wherein
    the cross domain HTTP request comprises one or more parameters, wherein
    the at least one native function is indicated by at least one of the parameters.

4. The method of claim 1, wherein
    the listener module is implemented based on a cross-platform language.

5. The method of claim 1, further comprising
    submitting the cross domain HTTP request comprises executing, by the browser, a script being contained in the HyperText-Markup Language (HTML) code of the web application, wherein
    a cross domain HTTP communication is achieved by HTML functionalities comprising an iFrame tag embedded in the HTML code of the web application.

6. The method of claim 1, wherein
the cross domain HTTP request comprises a session ID being particular to a session between the web application and the browser, and
the method further comprising:
receiving, by the listener module, a result generated by the at least one native function;
providing, by the listener module, the result and the session ID to a result collector module via a network, the result collector module running on a first remote computer system, the web application running on the first or on a second remote computer system; and
providing, by the result collector module, a notification to the web application that the result has been received for the session, wherein
the listener module makes use of one or more of the parameters received via the cross-domain HTTP request to address and call the result collector module.

7. The method of claim 6, wherein
the web application is updated in dependence on the provided result.

8. The method of claim 6, wherein
the result collector module executes a result handler upon a call by the listener module, the result handler receiving the result by the result collector module.

9. The method of claim 6, wherein
the result collector module is executing a check-result-received function, said function comprising checking, by the result collector module upon a call by the web application, if the result was received, and notifying the calling web application of the successful receipt of the result; or wherein
the result collector module is executing a provide-result function, said function comprising providing, upon a call of the web application, the result to the calling web application.

10. The method of claim 9, wherein
the web application calling the check-result-received function sends the session ID via the call as a key for checking whether the result created for the session of said session ID was successfully received by the result collector module; or wherein
the web application calling the provide-result function sends the session ID via the call as a key for selecting the result to be provided to the web application.

11. The method of claim 9, further comprising:
calling, by the web application, the check-result-received function repeatedly until a confirmation of a successful receipt of the result is obtained or until the number of repeated calls exceeds a first threshold value; and
in case the check-result-received function returned a notification of a successful receipt of the result, calling, by the web application, the provide-result function to receive the result from the result collector module and receiving the result by the web application.

12. The method of claim 8, wherein
the native function called by the listener module gathers biometrical data from the user of the mobile device, wherein
the gathered biometrical data is provided as the result to the result collector module,
the method further comprising:
evaluating, by the result collector module, the biometrical data of the user to determine if the user is authorized to access a security function provided by the web application, the evaluation returning an evaluation result;
downloading the evaluation result by the web application via the provide-result function;
granting or denying the user access to the security function by the web application in dependence on the evaluation result.

13. A system, comprising:
a mobile device comprising a hardware processor operable to execute at least one native function of the mobile device and initiate the following executable operations:
accessing a web application by a browser of the mobile processing device, the web application comprising at least one graphical user interface (GUI) element, the mobile device operating a listener module, the listener module being a Transmission Control Protocol/Internet Protocol (TCP/IP) socket listener listening for an address comprising a localhost IP address and a port number;
upon selection of the GUI element, submitting a cross domain HyperText-Transfer Protocol (HTTP) request by the browser to the listener localhost IP address;
receiving, by the listener module, the request; and
calling, by the listener module, the at least one native function in dependence on the received request.

14. The system of claim 13, wherein
the cross domain HTTP request comprises one or more parameters, wherein
the at least one native function is indicated by at least one of the parameters.

15. The system of claim 13, wherein the operations further comprising
submitting the cross domain HTTP request comprises executing, by the browser, a script being contained in the HyperText Markup Language (HTML) code of the web application, wherein
a cross domain HTTP communication is achieved by HTML functionalities comprising an iFrame tag embedded in the HTML code of the web application.

16. The system of claim 13, wherein
the cross domain HTTP request comprises a session ID being particular to a session between the web application and the browser,
the operations further comprising:
receiving, by the listener module, a result generated by the at least one native function;
providing, by the listener module, the result and the session ID to a result collector module via a network, the result collector module running on a first remote computer system, the web application running on the first or on a second remote computer system; and
providing, by the result collector module, a notification to the web application that the result has been received for the session, wherein
the listener module makes use of one or more of the parameters received via the cross-domain HTTP request to address and call the result collector module.

17. The system of claim 16, wherein
the web application is updated in dependence on the provided result.

18. The system of claim 16, wherein
the result collector module executes a result handler upon a call by the listener module, the result handler receiving the result by the result collector module.

19. The system of claim 16, wherein
the result collector module is executing a check-result-received function, said function comprising checking, by the result collector module upon a call by the web application, if the result was received, and notifying the calling web application of the successful receipt of the result; or wherein the result collector module is executing a provide-result function, said function comprising providing, upon a call of the web application, the result to the calling web application.

20. The system of claim 19, wherein the web application calling the check-result-received function sends the session ID via the call as a key for checking whether the result created for the session of said session ID was successfully received by the result collector module; or wherein the web application calling the provide-result function sends the session ID via the call as a key for selecting the result to be provided to the web application.

21. The system of claim 19, wherein the operations further comprising:

calling, by the web application, the check-result-received function repeatedly until a confirmation of a successful receipt of the result is obtained or until the number of repeated calls exceeds a first threshold value; and in case the check-result-received function returned a notification of a successful receipt of the result, calling, by the web application, the provide-result function to receive the result from the result collector module and receiving the result by the web application.

22. A computer program product for enabling a web application to call at least one native function of a mobile device, comprising:

a computer-readable hardware storage device having stored thereon program code that, when executed, configures a processor to perform the following executable operations:

accessing the web application by a browser of the mobile device, the web application comprising at least one graphical user interface (GUI) element, the mobile device operating a listener module, the listener module being a Transmission Control Protocol/Internet Protocol (TCP/IP) socket listener listening for an address comprising a localhost IP address and a port number;

upon selection of the GUI element, submitting a cross domain HyperText-Transfer Protocol (HTTP) request by the browser to the listener localhost IP address;

receiving, by the listener module, the request; and calling, by the listener module, the at least one native function in dependence on the received request.

23. The computer program product of claim 22, wherein the cross domain HTTP request comprises one or more parameters, wherein the at least one native function is indicated by at least one of the parameters.

24. The computer program product of claim 22, wherein the operations further comprising:

submitting the cross domain HTTP request comprises executing, by the browser, a script being contained in the HTML code of the web application, wherein a cross domain HTTP communication is achieved by HTML functionalities comprising an iFrame tag embedded in the HyperText-Markup Language (HTML) code of the web application.

25. The computer program product of claim 22, wherein the cross domain HTTP request comprises a session ID being particular to a session between the web application and the browser, the computer-readable storage medium further storing program code that, when executed, configures a processor to perform executable operations comprising:

receiving, by the listener module, a result generated by the at least one native function;

providing, by the listener module, the result and the session ID to a result collector module via a network, the result collector module running on a first remote computer system, the web application running on the first or on a second remote computer system; and providing, by the result collector module, a notification to the web application that the result has been received for the session, wherein the listener module makes use of one or more of the parameters received via the cross-domain HTTP request to address and call the result collector module.

* * * * *